(12) United States Patent
Cho (10) Patent No.: US 8,564,458 B2
(45) Date of Patent: Oct. 22, 2013

(54) COMMUNICATION METHOD FOR MONITORING LOCATION OF CONSTRUCTION EQUIPMENT

(75) Inventor: Yu-Hwan Cho, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 327 days.

(21) Appl. No.: 13/132,797

(22) PCT Filed: Oct. 21, 2009

(86) PCT No.: PCT/KR2009/006079
§ 371 (c)(1),
(2), (4) Date: Jun. 3, 2011

(87) PCT Pub. No.: WO2010/064789
PCT Pub. Date: Jun. 10, 2010

(65) Prior Publication Data
US 2011/0241904 A1 Oct. 6, 2011

(30) Foreign Application Priority Data
Dec. 4, 2008 (KR) .................. 10-2008-0122452

(51) Int. Cl.
*G08G 1/123* (2006.01)

(52) U.S. Cl.
USPC ........................... 340/992; 340/993; 340/989

(58) Field of Classification Search
USPC ............ 340/988, 989, 991, 992, 993, 539.13; 370/328, 338, 340; 455/433, 435; 299/1.3, 30; 701/49, 50
See application file for complete search history.

(56) References Cited

U.S. PATENT DOCUMENTS

| | | | | |
|---|---|---|---|---|
| 4,167,290 | A | * | 9/1979 | Yamazaki et al. ............. 299/1.3 |
| 5,748,620 | A | * | 5/1998 | Capurka ....................... 370/328 |
| 7,509,198 | B2 | * | 3/2009 | Shull et al. ...................... 701/50 |
| 2006/0193262 | A1 | | 8/2006 | McSheffrey et al. |

FOREIGN PATENT DOCUMENTS

| | | |
|---|---|---|
| KR | 20-0279481 | 6/2002 |
| KR | 10-0456524 A | 11/2004 |

OTHER PUBLICATIONS

Search Report dated Jun. 3, 2010 for International application PCT/KR2009/006079, filed Oct. 21, 2009 with an English translation attached.

* cited by examiner

*Primary Examiner* — Van T. Trieu
(74) *Attorney, Agent, or Firm* — John D. Veldhuis-Kroeze; Westman, Champlin & Koehler, P.A.

(57) ABSTRACT

The present disclosure relates to a communication method for monitoring the position of a construction machine. The communication method according to the present disclosure includes: generating positional information of the construction machine and at least one piece of state information and at least one piece of operation information associated with the construction machine in the construction machine; and transmitting the generated information to a remote management unit which is positioned in a remote area from the construction machine by using a communication means, wherein the remote management unit partitions an area where the construction machine is movable and previously determines the amount and transmission cycle of information to be transmitted from the construction machine in accordance with the partitioned area, and the amount of information to be transmitted other than the positional information from the construction machine is reduced as the construction machine is distant out of a boundary line of the movable area, on the basis of the positional information received from the construction machine. According to the present disclosure, by controlling the amount and communication cycle of information to be transmitted according to a distance between the boundary line of the movable area and the construction machine, the more accurate positional information can be provided in a theft danger state or a theft state while keeping power consumption.

4 Claims, 8 Drawing Sheets

T: TRANSMISSION CYCLE
R: RATIO OF POSITIONAL INFORMATION
  (POSITIONAL INFORMATION/TOTAL TRANSMITTED INFORMATION)
ΔL : DISTANCE BETWEEN BOUNDARY LINE OF WORK
  ALLOWANCE AREA AND CONSTRUCTION MACHINE
  (HOWEVER, A NEGATIVE (-) FIGURE WITHIN WORK ALLOWANCE AREA)

COMMUNICATION METHOD FOR MONITORING LOCATION OF CONSTRUCTION EQUIPMENT

This Application is a Section 371 National Stage Application of International Application No. PCT/KR2009/006079, filed Oct. 21, 2009 and published, not in English, as WO2010/064789 on Jun. 10, 2010.

FIELD OF THE DISCLOSURE

The present disclosure relates to a communication method for monitoring the position of a construction machine, and more particularly, to a communication method for preventing a construction machine from being stolen by monitoring the position of the construction machine with a communication means such as satellite communication and mobile communication.

BACKGROUND OF THE DISCLOSURE

A position monitoring apparatus or system that monitors and notifies of a position is generally used to verify and notify positions of persons and assets. A general position monitoring apparatus combines a navigation system such as a global positioning system (GPS) module and a mobile communication system such as a cell type modem to determine the position of a person or an asset to be monitored, that is, a geographical position and notify the position thereof to a control center or a monitoring facility positioned in a remote area. The position monitoring apparatus or system is used in various systems such as a logistics transportation tracking system and an asset recovering system.

By the position monitoring apparatus, an owner or a manager of a movable target determines the position of an asset that is in danger of being stolen or lost by using positional information sent from the asset to be monitored to prevent a theft danger or recover the lost asset.

In the case in which a monitoring target operates within a predetermined movable area like the construction machine, an owner or manager previously can set a boundary of the movable area and enable the construction machine to transmit various pieces of information such as positional information and determines the position of the construction machine based on the positional information thereof to track the position of the corresponding construction machine when the construction machine deviates from the boundary of the movable area. A so-called Geo-Fence System which monitors motions or positions is used and this system provides a positional coordinate set defining an area where the monitoring target can move and when the monitoring target moves with deviating from a positional coordinate, this system helps recovering the asset by notifying the fact to an owner of the target and/or a low enforcement agency through a monitoring service.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

By a known position monitoring apparatus or method, a construction machine which is a monitoring target can be configured to generate various pieces of information such as positional information through a GPS and transmit the information such as the positional information to a management unit (hereinafter, referred to as a 'remote management unit') which is positioned in a remote area. When the construction machine continues to deviate from a movable area for a long time and communication amount is thus increased, excessive power consumption may take place.

In particular, the information transmitted from the construction machine may include state information such as engine temperature or a fuel level of the construction machine, operation information associated with operation of the construction machine, such as an operation hour or a working hour, and the like in addition to the positional information in order for a remote owner or manager to manage the construction machine efficiently. As the amount of the transmitted information increases, consumed power also increases. For example, in the case in which power supplied to a battery power driven type position monitoring apparatus is used up while the construction machine transmits at least one piece of information to the owner or manager (remote management unit), the corresponding construction machine may not transmit information required by a monitoring facility any longer.

Meanwhile, the information transmitted from the construction machine to the remote management unit is transmitted at a predetermined cycle. In this case, as the transmission cycle is short, positional information close to a real time can be acquired, but since a power amount for transmission is thus increased, setting an appropriate transmission cycle is required. Further, when the construction machine is configured to transmit the positional information, and the like at the predetermined cycle even while the construction machine is in a starting off state, battery power of the construction machine is used, and as a result, the amount or transmission cycle of information to be transmitted needs to be efficiently determined.

The present disclosure is contrived to solve the problems in the related art. An object of the present disclosure is to provide a method and an apparatus capable of effectively controlling the amount and transmission cycle of transmitted information while maximally keeping low a transmission cost and power consumption of a construction machine.

In order to achieve the above-mentioned object, the present disclosure controls a transmitted data amount other than positional information transmitted from a construction machine to be reduced and a transmission cycle to be shortened when there is a concern about theft of the construction machine or a theft possibility is high.

Objects and advantages other than the above-mentioned object and advantage will be apparent through the following detailed description and accompanying drawings.

According to the present disclosure, by controlling the amount and transmission cycle of information to be transmitted according to a distance between a boundary of a work allowance area and a construction machine, positional information can be provided approximately in real time in a theft danger state or a theft state while maximally keeping power consumption.

DETAILED DESCRIPTION

According to a first aspect of the present disclosure, a communication method for monitoring the position of a construction machine includes: generating positional information of the construction machine and at least one piece of state information and at least one piece of operation information associated with the construction machine in the construction machine; and transmitting the generated information to a remote management unit which is positioned in a remote area from the construction machine by using a communication means, in which the remote management unit partitions an area where the construction machine is movable and previously determines the amount and transmission cycle of information to be transmitted from the construction machine in accordance with the partitioned area, and the amount of information to be transmitted other than the positional information from the construction machine is reduced as the construction machine is distant out of a boundary line of the movable area, on the basis of the positional information received from the construction machine.

In the exemplary embodiment, the transmission cycle from the construction machine may be shortened as the construction machine is distant out of the boundary line of the movable area, on the basis of the positional information received from the construction machine.

In another exemplary embodiment, the amount of the information other than the positional information from the construction machine is reduced and the transmission cycle thereof is shortened as the construction machine is close to the boundary line within the movable area, and the amount of the information other than the positional information from the construction machine is further reduced and the transmission cycle thereof is further shortened as the construction machine is distant out of the boundary line of the movable area, on the basis of the positional information received from the construction machine.

In yet another exemplary embodiment, in the partitioning of the area where the construction machine is movable, the area is at least partitioned into a first area, a second area, a third area, and a fourth area in a direction distant from the center of the movable area and the first area and the second area are set within the boundary line of the movable area and in this case, the second area is set to contact the boundary line of the movable area, and the third area and the fourth area are set out of the boundary line of the movable area and in this case, the third area is set to contact the boundary line of the movable area, and the transmission cycle is determined to be T1>T2>T3>T4 (wherein, Tn represents a transmission cycle in an n-th area) and the amount of the information to be transmitted is determined to be R1<R2<R3<R4=1 (wherein, Rn represents a ratio of positional information amount to total transmitted information amount in the n-th area), in accordance with the partitioned area.

Hereinafter, exemplary embodiments of the present disclosure will be described in more detail with reference to the accompanying drawings.

Figure 1:
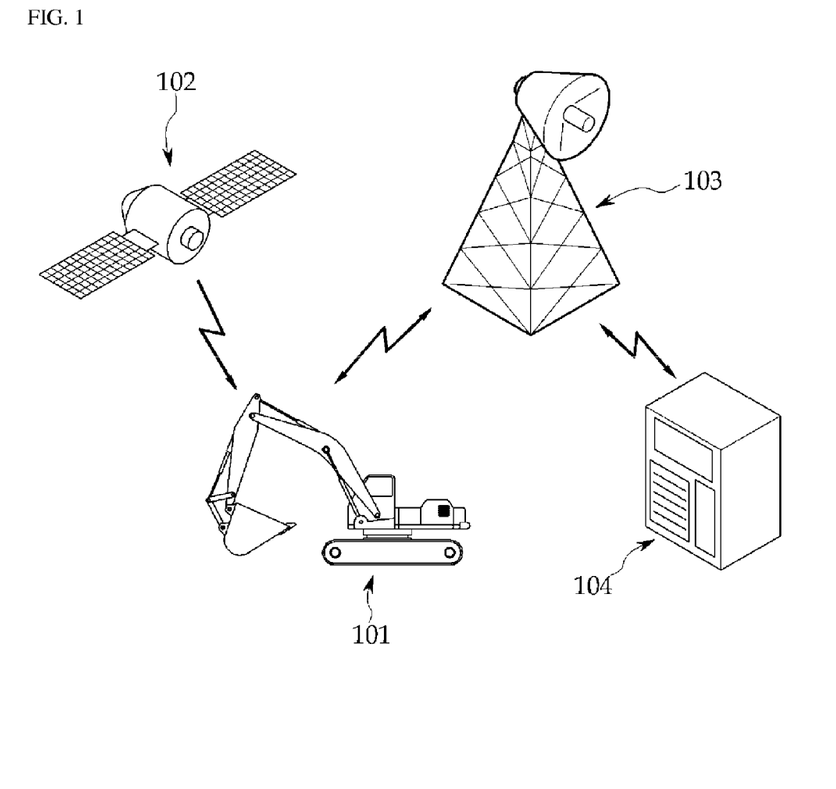
FIG. 1 is a configuration diagram schematically showing a configuration in which a construction machine and a monitoring facility communicate with each other according to an exemplary embodiment of the present disclosure.

FIG. 1 is a configuration diagram schematically showing a configuration in which a construction machine and a monitoring facility communicate with each other according to an exemplary embodiment of the present disclosure.

In a communication method of the present disclosure, for example, positional information of a construction machine 101 generated by using a position-related signal received from a GPS satellite 102 and state and/or operation information of the construction machine are transmitted from an information transmitting communication apparatus mounted on the construction machine to a remote management unit 104 by using satellite communication or mobile communication facility 103, and the remote management unit transmits a control signal to the construction machine 101 through the satellite communication or mobile communication facility 103.

Hereinafter, a procedure in which the construction machine and a monitoring facility communicate with each other in the present disclosure will be described in more detail on the basis of the above-mentioned configuration.

Figure 2:
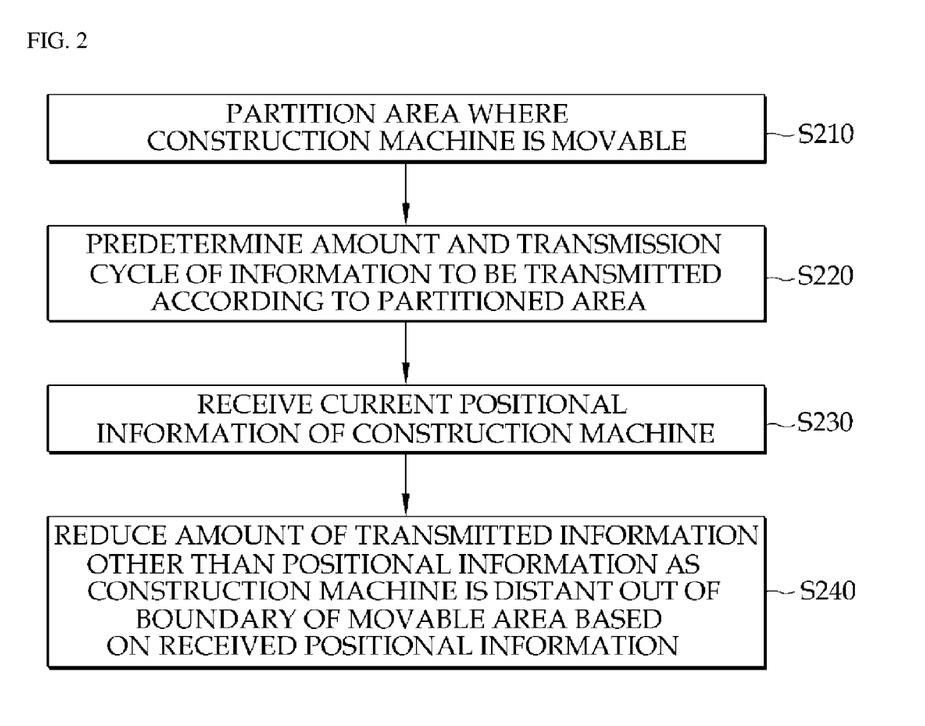
FIG. 2 is a flowchart schematically showing each step of a method for monitoring the position of a construction machine according to an exemplary embodiment of the present disclosure.

FIG. 2 is a flowchart schematically showing each step of a method for monitoring the position of a construction machine according to an exemplary embodiment of the present disclosure.

Referring to FIG. 2, first, a remote management unit positioned in a remote area from the construction machine partitions an area where the construction machine can move (step S210). The remote management unit previously determines the amount and a transmission cycle of information to be transmitted depending on the partitioned area (step S220). When the positional information is received from the construction machine (step S230), communication power can be reduced by reducing the amount of transmission information other than the positional information as the construction machine becomes distant from a boundary line of the area where the construction machine can be move based on the positional information thereof (step S240). Meanwhile, the boundary line of the movable area may be a boundary line of an area where the construction machine routinely operates in the movable area.

In the exemplary embodiment, the remote management unit may direct the transmission cycle at which the construction machine transmits information to be shortened as the construction machine becomes distant from the boundary line of the area where the construction machine can move, on the basis of the positional information received from the construction machine. As a result, when the construction machine is positioned out of the boundary line of the movable area, tracking of the position thereof becomes easier.

In the exemplary embodiment, the remote management unit reduces the amount of the information other than the positional information received from the construction machine and shortens the transmission cycle of the information as the positions of the construction machine become close to the boundary line of the movable area in the movable area, based on the positional information received from the construction machine and further reduces the amount of the transmission information other than the positional information received from the construction machine and further shortens the transmission cycle as the construction machine becomes distant from the boundary line of the movable area. As a result, when the construction machine is positioned within the boundary line of the movable area, the transmission power can be reduced by reducing the amount of the transmission information other than the positional information even though the information transmission cycle from the construction machine becomes faster as the construction machine becomes close to the boundary line, that is, a possibility that the construction machine will be separated from the boundary line of the movable area increases. Meanwhile, when the construction machine becomes further distant out of the boundary line of the movable area, the position of the construction machine can be smoothly tracked by further reducing the amount of the information other than the positional information among the information transmitted from the construction machine and further shortening the transmission cycle thereof.

Figure 3:
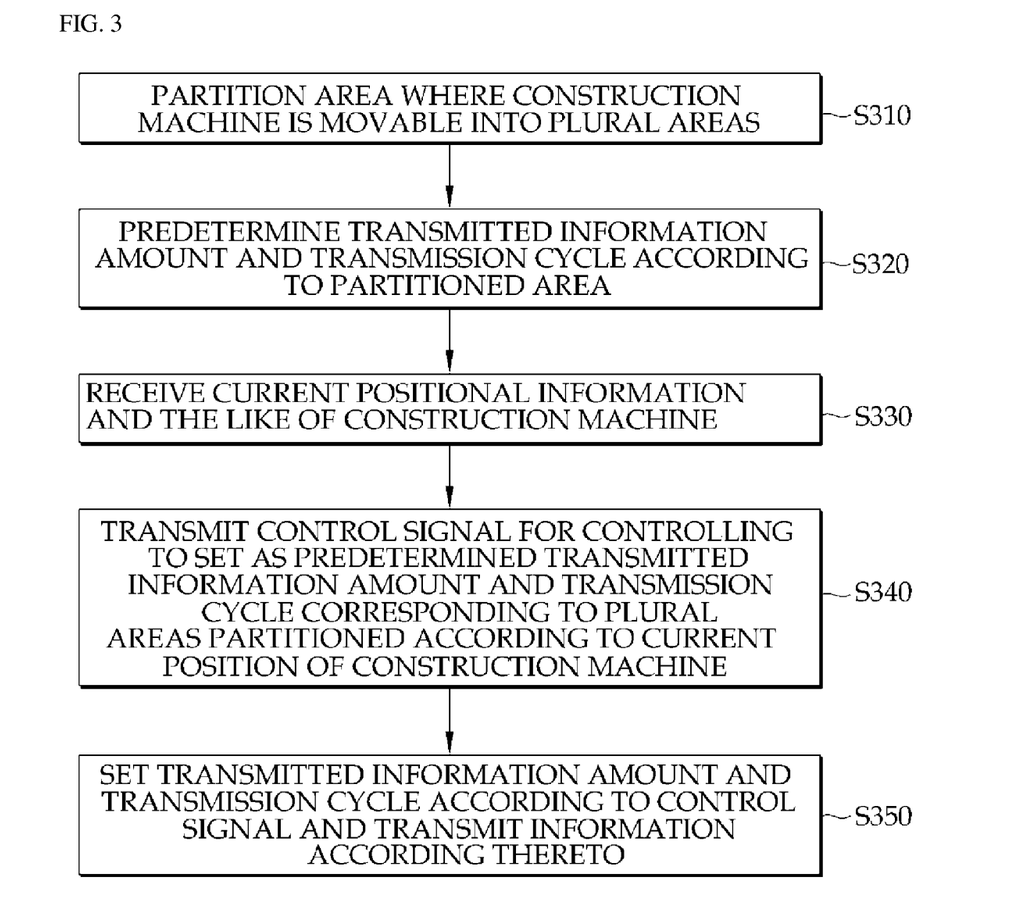
FIG. 3 is a flowchart schematically showing each step of a method for monitoring the position of a construction machine according to another exemplary embodiment of the present disclosure.

FIG. 3 is a flowchart schematically showing each step of a method for monitoring the position of a construction machine according to another exemplary embodiment of the present disclosure.

Referring to FIG. 3, first, the remote management unit positioned in the remote area from the construction machine partitions the area where the construction machine can move (step S310) and previously determines the amount of the information to be transmitted (alternatively, transmitted data amount) and the transmission cycle in association with transmission of the information from the construction machine depending on the partitioned area (step S320). Herein, the area where the construction machine can move is an area arbitrarily set by a user or a manager and a boundary of the movable area may be a general working area where the construction machine is allowed to work. In the exemplary embodiment, the remote management unit may store, in a table format, the amount and transmission cycle of information to be transmitted, which corresponds to each partitioned area in a storage device included in the remote management unit. Herein, the predetermined transmission information amount and transmission cycle are predetermined so that the amount of the information to be transmitted is reduced and the transmission cycle is shortened as the partitioned area is close to the boundary line of the movable area when the partitioned area is in the boundary line of the movable area, and may be determined so that the predetermined information to be transmitted is reduced and the transmission cycle is shortened as the partitioned area becomes distant out of the movable area when the partitioned area is out of the movable area.

The construction machine generates positional information (that is, current positional information) of the construction machine and generates at least one piece of state information and at least one piece of operation information to transmit the information to the remote management unit. The remote management unit receives the positional information, the state information, and the operation information (step S330). In the exemplary embodiment, the positional information generated from the construction machine may be generated through a navigation system included in the construction machine by using, for example, a signal related to a current position, which is received from the GPS satellite, but may be generated through various other terrestrial and satellite position determining systems. Further, information transmitted together with the positional information may include any information which a remote owner or manager (alternatively, the remote management unit) needs to efficiently manage the construction machine, in addition to the state information and the operation information. In addition, it will be understood by those skilled in the art that the information can be transmitted from the construction machine to the remote management unit through various usable mobile communication systems.

The remote management unit that receives the information including the positional information from the construction machine judges which area among the previously partitioned areas the position of the construction machine is included in, on the basis of the received positional information and transmits a control signal to direct the predetermined amount of the information to be transmitted and the predetermined transmission cycle to correspond to the area to which the construction machine belongs, from the remote management unit to the construction machine (step S340). The construction machine sets the amount and transmission cycle of information to be transmitted thereafter and transmits the information to the remote management unit according to the received control signal (step S350).

Hereinafter, a step of partitioning the movable area and a step of determining the amount and transmission cycle of the information to be transmitted will be described in more detail.

Figure 4:
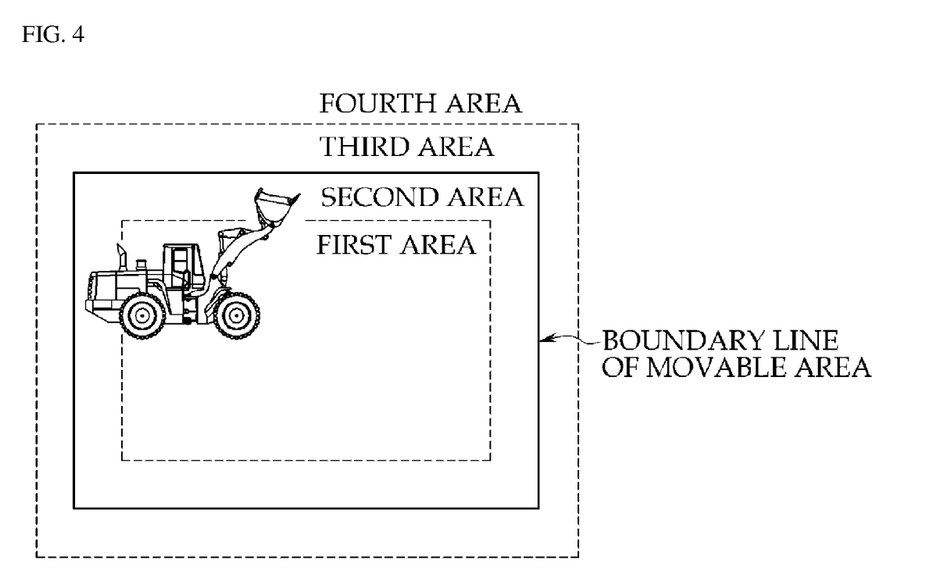
FIG. 4 is a configuration diagram showing a movable area of a construction machine which is partitioned according to an exemplary embodiment of the present disclosure.

FIG. 4 is a configuration diagram showing a movable area of a construction machine which is partitioned according to an exemplary embodiment of the present disclosure. Referring to FIG. 4, the movable area may be partitioned into a first area, a second area, a third area, and a fourth area. Herein, the first area may be a 'routine working position' as a state in which that the construction machine is within the boundary line of the movable area, however, it is not in contact with the boundary line of the movable area. The second area may be a 'position in which theft may occur' as a state in which the construction machine is within the boundary line of the movable area, however, it is in contact with the boundary line of the movable area. The third area is a 'position in which theft is feared' as a state in which the construction machine gets out of the boundary of the movable area to be in contact with the boundary line of the movable area. The fourth area may be a 'position in which theft is certain' as a state in which the construction machine is also distant from the boundary line of the movable area while it gets out of the boundary line of the movable area. In the exemplary embodiment, although the boundary line or the partitioned area of the movable area has a quadrangle, its shape may be set as a circle, an oval, or a predetermined shape to be suitable for the owner or manager to manage the construction machine effectively. Further, in the exemplary embodiment, the movable area is partitioned into four areas on the basis of the boundary line, but it will be understood by those skilled in the art that the movable area may be further subdivided according to a distance from the boundary line of the movable area in some exemplary embodiments.

Figure 5:
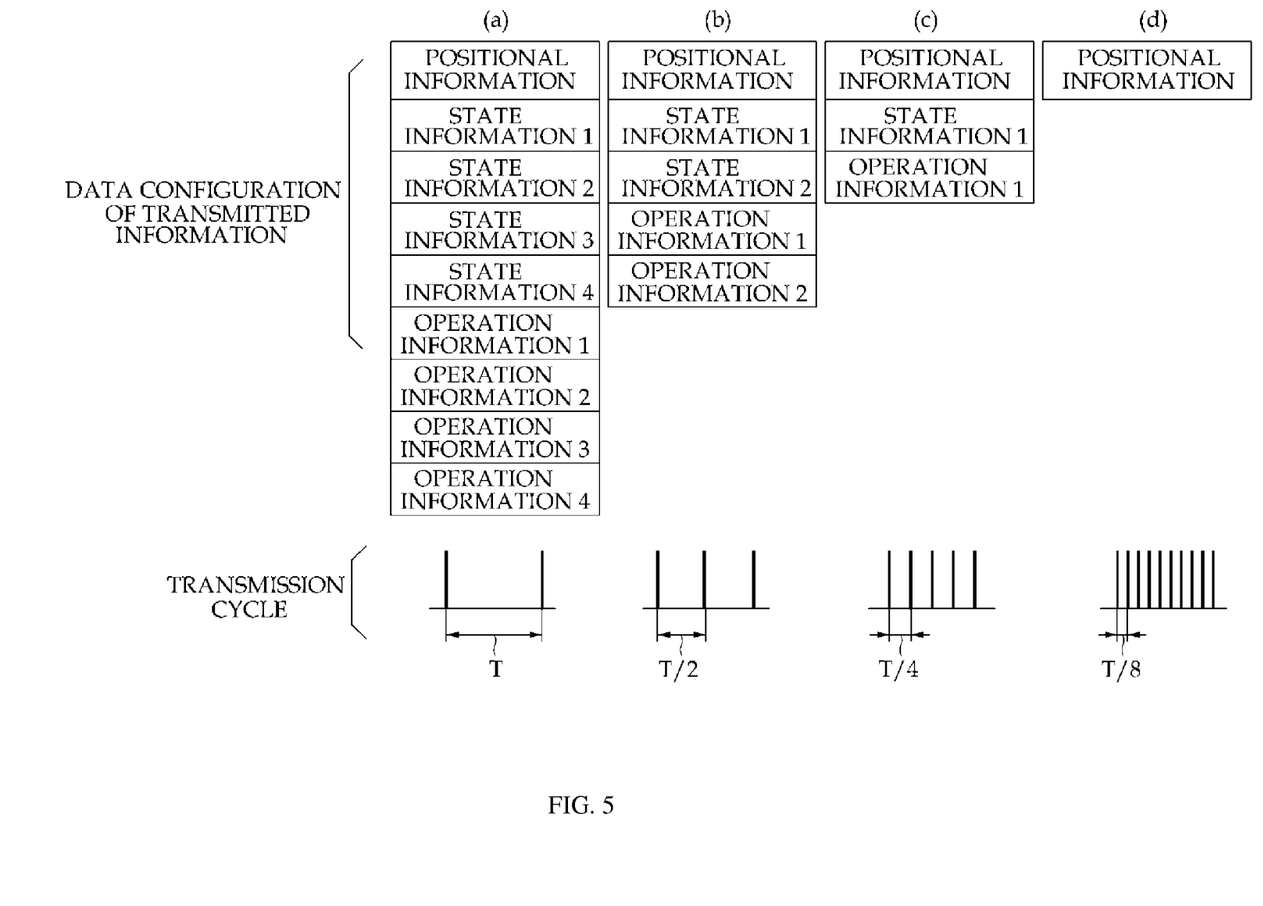
FIG. 5 is a diagram showing the relationship between a transmitted information amount and a transmission cycle corresponding to a partitioned area according to an exemplary embodiment of the present disclosure.

A step of predetermining the amount and transmission cycle of the information to be transmitted in association with transmission of the information from the construction machine according to the partitioned area will be described in more detail with reference to FIG. 5. FIG. 5 is a diagram showing the relationship between different data amounts and transmission cycles of transmitted information corresponding to each partitioned area according to an exemplary embodiment of the present disclosure.

FIG. 5(a) shows a case in which the construction machine is positioned in the first area, which corresponds to the routine working position within the boundary line of the movable area and in this case, the positional information, the state information, and the operation information are all transmitted as communication data and the transmission cycle is set to a cycle T of a predetermined routine case.

FIG. 5(b) shows a case in which the construction machine is close to or in contact with the boundary line of the movable area, which corresponds to the position in which theft may occur and in this case, the positional information among the transmission information is subjected to a transmission state and the data amount of the transmitted information is reduced by transmitting information other than information having low priority among at least one pieces of state information and/or at least one piece of operation information. Meanwhile, by reducing the data amount of the transmitted information and making the communication cycle be earlier than that of the first area (in FIG. 5, the cycle is decreased by ½ times as compared with FIG. 5(a)), a frequency to transmit information including the positional information for unit hour is increased. To this end, the step of predetermining the amount of the information to be transmitted may include a step of previously determining priorities of at least one piece of state information or at least one piece of operation information other than the positional information. Meanwhile, in this case, a transmission coast may maintain substantially the same level as that of FIG. 5(a) as possible.

FIG. 5(c) shows a case in which theft is feared as the construction machine gets out of the boundary line of the movable area and theft is feared and in this case, similarly as the case of FIG. 5(b), the positional information among the transmitted information maintains the transmission state and information other than state information and operation information having low priority among at least one piece of state information and at least one operation information is transmitted, and as a result, data amount of entire transmitted information are smaller than those of FIG. 5(b). Meanwhile, the transmission cycle is four times earlier than that of FIG. 5(b), and as a result, the position of the construction machine can be more accurately tracked. In this case, the transmission cost may be set to maintain substantially the same level as that of FIG. 5(a) or 5(b).

FIG. 5(d) shows a case in which the construction machine gets out of the boundary line of the movable area to be distant from the boundary line and in this case, theft may be certain. The communication data is configured by transmitting only positional information other than both the state information and the operation information, as a result, the data amount of the entire transmitted information is further decreased as compared with that of FIG. 5(a), 5(b), or 5(c), but the transmission cycle is 8 times earlier than that of FIG. 5(a), 5(b), or 5(c), and as a result, the position of the construction machine can be tracked more rapidly and accurately, thereby rapidly taking action against a theft situation. Even in this case, the transmission cost may be set to maintain substantially the same level as that of FIG. 5(a), 5(b), or 5(c).

In the above-mentioned exemplary embodiment, the movable area is partitioned into four areas according to the distance from the boundary line of the movable area, but the four areas may be further subdivided as necessary and used by functionalization in proportion to the distance from the boundary line of the movable area. Further, the fourth area described above may be set as an area other than the first, second, and third areas, which exist outside the work allowance area.

Further, in the above-mentioned exemplary embodiment, the movable area is partitioned based on the distance from the boundary line thereof, but the movable area may be subdivided based on a distance from a central point of the movable area. That is, by partitioning the area based on the distance from the central point of the movable area according to a movement direction of the construction machine, an amount of transmitted information other than the positional information is reduced and the transmission cycle thereof is further shortened as the construction machine is distant from the central point.

Figure 6:
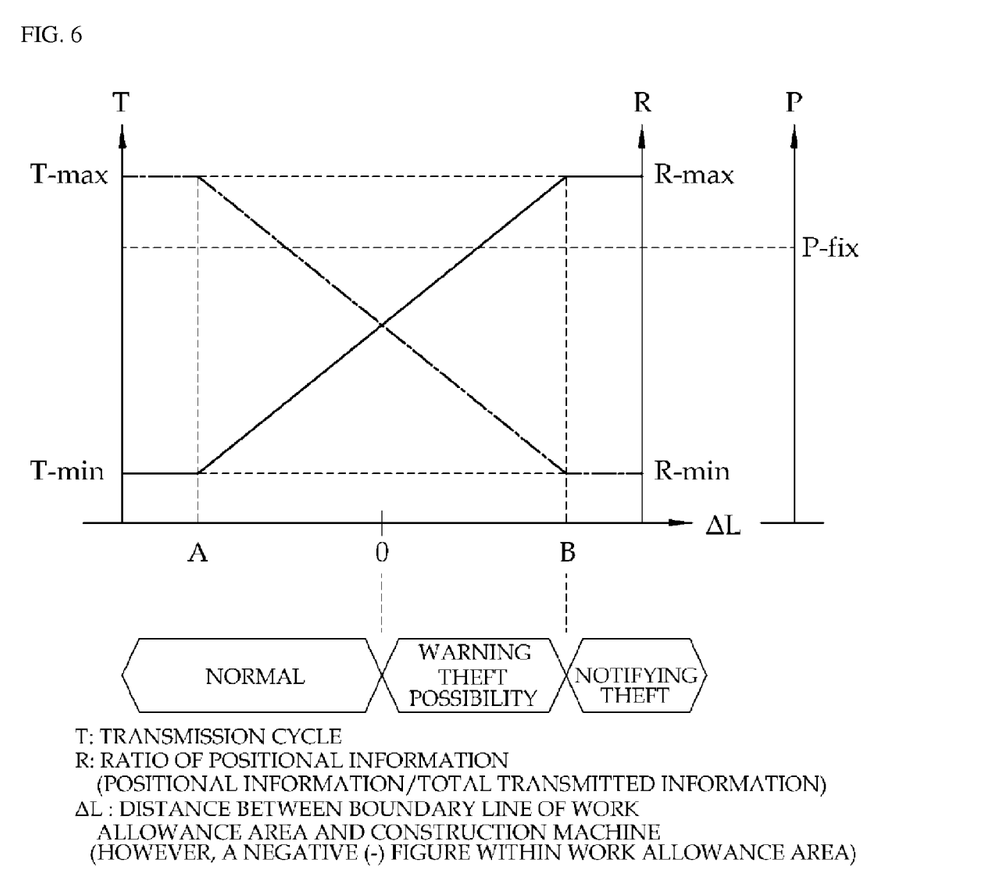
FIG. 6 is a diagram showing the relationship between a transmitted information amount and a transmission cycle with the position of a construction machine according to an exemplary embodiment of the present disclosure.

FIG. 6 is a diagram showing the relationship between a transmitted information amount and a transmission cycle with the position of a construction machine according to an exemplary embodiment of the present disclosure. FIG. 6 shows ratios, transmission cycle, and transmission costs of state information and operation information with respect to positional information in an amount of information to be transmitted (alternatively, a configuration of transmitted information), which depends on a position. In FIG. 6, a functional relationship among the transmission cycle T, a ratio R of the positional information (herein, R represents the positional information/the entire transmitted information), a distance $\Delta L$ from a boundary line of the work allowance area to the construction machine (however, a negative (−) figure within the work allowance area), and the transmission cost P may be shown below.

Before the construction machine deviates from point A, transmission can be performed with a configuration of transmitted information having a predetermined positional information ratio R_min and a transmission cycle T_max. In this case ($\Delta L<A$), there may be defined as the transmission cycle, T=T_max, for the positional information ratio, R=R_min, and the transmission cost, P=P_fix.

Meanwhile, before the construction machine gets out of point A and reaches point B, the ratio of the positional information to the entire transmitted information is high in direct proportion to the position of the construction machine and the transmission cycle is shortened in inverse proportion to the distance $\Delta L$ from the boundary line of the movable area to the construction machine (however, the negative (−) figure within the boundary line of the movable area). At this time, when the construction machine gets out of a point where $\Delta L$ is 0 (when the construction machine is on the boundary line of the movable area) and breaks away from the work allowance area, a theft possibility may be warned to the owner or manager (remote management unit). Functionalization thereof is as follows.

In the case of $A<\Delta L<B$, for the transmission cycle, $T=T\_max-((T\_max-T\_min)/(B-A))\times\Delta L$, for the positional information ratio, $R=R\_min+((R\_max-R\_min)/(B-A))\times\Delta L$, for the transmission cost, P=P_fix Further, when the construction machine gets out of point B and is distant from the boundary line of the movable area, transmission can be performed with the configuration of the transmitted information of the predetermined positional information ratio R_max and the transmission cycle T_min. Further, in this case, theft is regarded to be certain to notify the occurrence of theft to the owner or manager. Even in this case, the transmission cost is maintained as the same level P_fix. Functionalization thereof is as follows.

In the case of B<ΔL, for the transmission cycle, T=T_min, for the positional information ratio to the entire transmitted information, R=R_max, for the transmission cost, P=P_fix As described above, the movable area of the construction machine is positioned into four areas including the first area, the second area, the third area, and the fourth area, the amount of the information to be transmitted and the transmission cycle according to each area may be shown as follows.

T1>T2>T3>T4 (wherein Tn represents a transmission cycle in an n-th area)

R1<R2<R3<R4 (wherein Rn represents a ratio between a total transmitted information amount and a positional information amount=the positional information amount/the total transmitted information amount in the n-th area)

Meanwhile, in the exemplary embodiment, as shown in the fourth area of FIG. 6, R4=1. The fourth area is the area in which theft of the construction machine is certain and in this case, since the remote management unit may not require the state information or operation information of the construction machine, positional information closer to the real time is received by setting the transmission cycle to be shorter instead of setting only the positional information of the construction machine to be received.

Further, in the exemplary embodiment, when the construction machine is at the 'position in which theft is feared' or at the 'position in which theft is certain' the remote management unit may be configured to notify theft possibility alarm or theft alarm.

Figure 7:
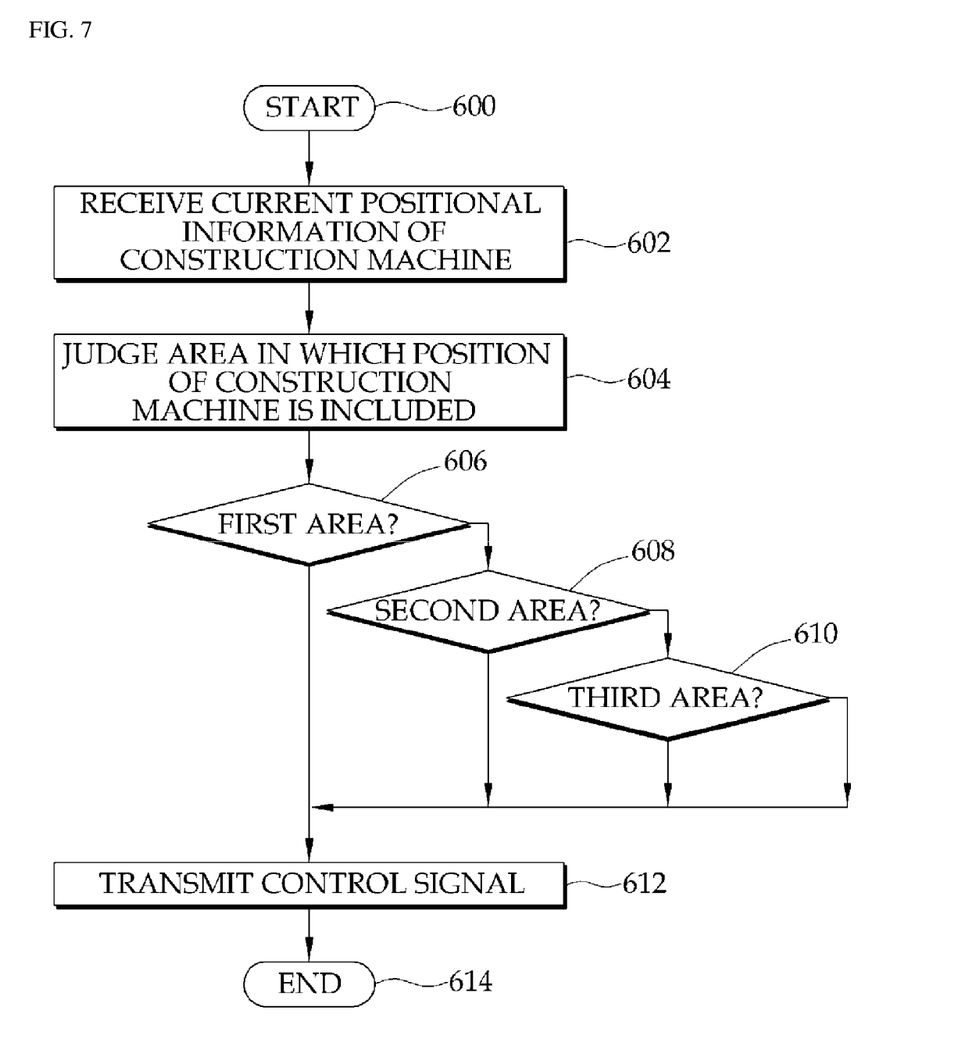
FIG. 7 is a flowchart showing steps of controlling a transmitted information amount and a transmission cycle according to an exemplary embodiment of the present disclosure.

FIG. 7 is a flowchart showing steps of controlling a transmitted information amount and a transmission cycle according to an exemplary embodiment of the present disclosure. According to the exemplary embodiment, after starting (step 600) the method, the remote management unit judges (step 604) which area the current position of the construction machine belongs to (steps 606, 608, and 610) on the basis of the received (step 602) positional information and the remote management unit may transmit (step 612) a control signal indicating a predetermined amount of information to be transmitted and a transmission cycle, which correspond to the area to which the construction machine belongs, to the construction machine (step S614).

Figure 8:
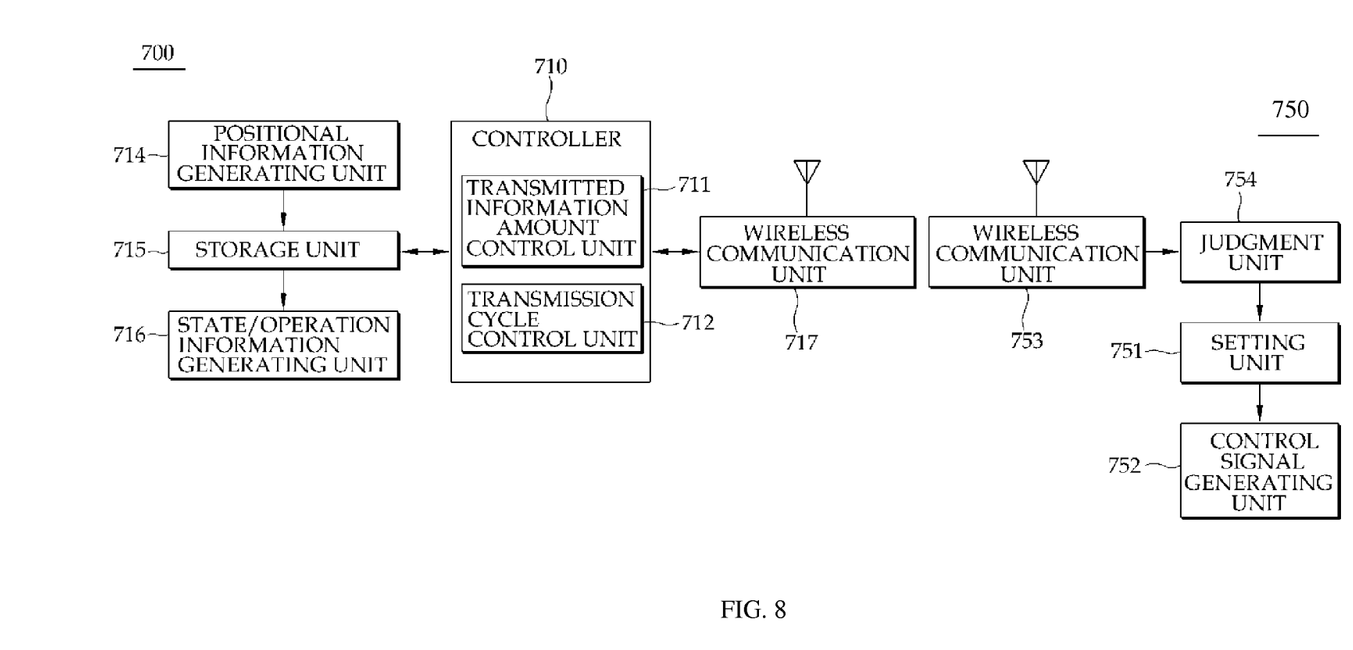
FIG. 8 is a block diagram showing an example of information monitoring mounted on a construction machine according to an exemplary embodiment of the present disclosure.

FIG. 8 is a block diagram showing information transmitting communication apparatus 700 of a construction machine and a control signal generating unit 752 of a remote management unit 750 according to an exemplary embodiment of the present disclosure.

According to the exemplary embodiment, the information transmitting communication apparatus 700 of the construction machine may include a controller 710 including a transmitted information amount controlling unit 711 and a transmission cycle controlling unit 712, a positional information generating unit 714, a storage unit 715, a state/operation information generating unit 716, and a wireless communication unit 717. In order to transmit the positional information, the state information, and the operation information to the remote management unit, the information transmitting communication apparatus generates the corresponding information and stores the information in the storage unit through the positional information generating unit and the state/operation information generating unit. The controller 710 transmits the information such as the positional information, and the like through the wireless communication unit 717 to the remote management unit according to the predetermined amount of the information to be transmitted and the transmission cycle. The remote management unit may include a judgment unit 754 judging an area in which the construction machine is positioned among previously partitioned areas on the basis of the positional information received through the wireless communication unit 753, a setting unit 751 setting the amount of the information to be transmitted and the transmission cycle and notifying the predetermined amount of the information to be transmitted and the transmission cycle on the basis of a result of the judgment unit, and a control signal generating unit 752 generating a control signal representing the transmitted information amount and the transmission cycle received by the setting unit and transmitting the generated control signal to the construction machine.

As described above, although the present disclosure has been described on the basis of the exemplary embodiments, it will be understood by those skilled in the art that changes can be made without departing from the spirit and scope of the present disclosure. That is, since the present disclosure can be changed within the appended claims, the present disclosure should not be regarded to be limited to the exemplary embodiments.

The present disclosure relates to a communication method for monitoring the positions of a construction machine and can be applied to prevent theft of the construction machine by monitoring the position of the construction machine.

Although the present invention has been described with reference to preferred embodiments, workers skilled in the art will recognize that changes may be made in form and detail without departing from the spirit and scope of the invention.

The invention claimed is:

1. A communication method for monitoring the position of a construction machine, the method comprising:

generating positional information of the construction machine and at least one piece of state information and at least one piece of operation information associated with the construction machine in the construction machine; and transmitting the generated information to a remote management unit which is positioned in a remote area from the construction machine by using a communication means, wherein the remote management unit partitions an area where the construction machine is movable and previously determines the amount and transmission cycle of information to be transmitted from the construction machine in accordance with the partitioned area, and the amount of information to be transmitted other than the positional information from the construction machine is reduced as the construction machine is distant out of a boundary line of the movable area, on the basis of the positional information received from the construction machine.

2. The communication method for monitoring the position of a construction machine according to claim 1, wherein the transmission cycle from the construction machine is shortened as the construction machine is distant out of the boundary line of the movable area, on the basis of the positional information received from the construction machine.

3. The communication method for monitoring the position of a construction machine according to claim 1, wherein the amount of the information other than the positional information from the construction machine is reduced and the transmission cycle thereof is shortened as the construction machine is close to the boundary line within the movable area, and the amount of the information other than the positional information from the construction machine is further reduced and the transmission cycle thereof is further shortened as the construction machine is distant out of the boundary line of the movable area, on the basis of the positional information received from the construction machine.

4. The communication method for monitoring the position of a construction machine according to claim 1, wherein in the partitioning of the area where the construction machine is movable, the area is at least partitioned into a first area, a second area, a third area, and a fourth area in a direction distant from the center of the movable area and the first area and the second area are set within the boundary line of the movable area and in this case, the second area is set to contact the boundary line of the movable area, and the third area and the fourth area are set out of the boundary line of the movable area and in this case, the third area is set to contact the boundary line of the movable area, and the transmission cycle is determined to be $T1>T2>T3>T4$ (wherein Tn represents a transmission cycle in an n-th area) and the amount of the information to be transmitted is determined to be $R1<R2<R3<R4=1$ (wherein Rn represents a ratio of positional information amount to total transmitted information amount in the n-th area), in accordance with the partitioned area.

* * * * *